United States Patent
Melville et al.

(10) Patent No.: US 10,302,756 B2
(45) Date of Patent: *May 28, 2019

(54) SYSTEM AND METHOD FOR ESTIMATING RANGE TO AN RFID TAG

(71) Applicant: Amtech Systems, LLC, Albuquerque, NM (US)

(72) Inventors: Michael George Melville, Albuquerque, NM (US); John Todd Elson, Albuquerque, NM (US)

(73) Assignee: AMTECH SYSTEMS, LLC, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/837,585

(22) Filed: Dec. 11, 2017

(65) Prior Publication Data

US 2018/0100919 A1    Apr. 12, 2018

Related U.S. Application Data

(63) Continuation of application No. 15/062,766, filed on Mar. 7, 2016, now Pat. No. 9,841,500, which is a continuation of application No. 14/734,655, filed on Jun. 9, 2015, now Pat. No. 9,316,728, which is a
(Continued)

(51) Int. Cl.
| | |
|---|---|
| *G06K 7/10* | (2006.01) |
| *G01S 13/08* | (2006.01) |
| *G01S 13/75* | (2006.01) |
| *G01S 13/32* | (2006.01) |
| *G01S 13/36* | (2006.01) |
| *G01S 13/58* | (2006.01) |
| *G01S 13/84* | (2006.01) |

(Continued)

(52) U.S. Cl.
CPC .............. *G01S 13/75* (2013.01); *G01S 13/08* (2013.01); *G01S 13/325* (2013.01); *G01S 13/36* (2013.01); *G01S 13/584* (2013.01); *G01S 13/84* (2013.01); *G01S 13/91* (2013.01); *G06K 7/10366* (2013.01); *G06K 7/10425* (2013.01); *G01S 13/878* (2013.01)

(58) Field of Classification Search
CPC ........ G01S 13/84; G01S 13/878; G01S 13/08; G01S 3/38; G07B 15/063; G06K 7/10019; G06K 7/10356; G08G 1/167
See application file for complete search history.

(56) References Cited

U.S. PATENT DOCUMENTS

| | | | |
|---|---|---|---|
| 6,184,841 B1 * | 2/2001 | Shober | H01Q 1/2225 343/853 |
| 2005/0129139 A1 * | 6/2005 | Jones | A63B 24/0021 375/295 |

(Continued)

*Primary Examiner* — Mirza F Alam
(74) *Attorney, Agent, or Firm* — Snyder, Clark, Lesch & Chung, LLP (57) ABSTRACT

A system is described for measuring distance between an RFID reader and an RFID backscatter tag, including an adaptive linear combiner, which is a tapped delay line with controllable weights on each tap, and outputs that are summed and subtracted from a reference to produce an error signal. After a sufficient number of cycles, the weight distribution indicates the delay of the received signal with respect to the reference, and by extension determines the distance between the tag and receiver.

14 Claims, 5 Drawing Sheets

Related U.S. Application Data continuation of application No. 13/753,338, filed on Jan. 29, 2013, now Pat. No. 9,081,088.

(60) Provisional application No. 61/594,906, filed on Feb. 3, 2012.

(51) Int. Cl.
*G01S 13/91* (2006.01)
*G01S 13/87* (2006.01)

(56) References Cited

U.S. PATENT DOCUMENTS

| | | | | |
|---|---|---|---|---|
| 2008/0150699 | A1* | 6/2008 | Ohara | G01S 13/84 340/10.4 |
| 2009/0007185 | A1* | 1/2009 | Nix | H04B 7/10 725/62 |
| 2010/0328073 | A1* | 12/2010 | Nikitin | G01S 5/0247 340/572.1 |
| 2011/0187600 | A1* | 8/2011 | Landt | G01S 3/02 342/458 |
| 2011/0304441 | A1* | 12/2011 | Roesner | G07B 15/063 340/10.4 |
| 2014/0302869 | A1* | 10/2014 | Rosenbaum | H04W 4/026 455/456.1 |

* cited by examiner

SYSTEM AND METHOD FOR ESTIMATING RANGE TO AN RFID TAG

CROSS-REFERENCE TO RELATED APPLICATIONS

This application is a continuation of U.S. patent application Ser. No. 15/062,766 filed on Mar. 7, 2016; which application is a continuation of U.S. patent application Ser. No. 14/734,655 filed on Jun. 9, 2015, now U.S. Pat. No. 9,316,728; which is a continuation of U.S. patent application Ser. No. 13/753,338 filed Jan. 29, 2013, now U.S. Pat. No. 9,081,088; all three of which claim the benefit of provisional application Ser. No. 61/594,906 filed on Feb. 3, 2012, entitled "System and Method for Estimating Range to an RFID tag." The entire disclosures of the four applications listed above are hereby incorporated herein by reference.

BACKGROUND OF THE INVENTION

Estimation of the distance to a tag in a Radio Frequency Identification (RFID) system is a useful feature. It would provide for an improved method of cross-lane discrimination in RFID tolling stations, while also providing a platform to estimate vehicle speeds in the same type of application. While there are many techniques developed in prior art for range estimation, this approach uses digital components in the receiver. Patents in the general field include U.S. Pat. Nos. 6,600,443; 6,476,756 and 7,030,361.

Past methods include angle of arrival at multiple receivers, received signal strength indicator (RSSI), and variation of phase in a received signal. Each of these has their strengths but the present method particularly applies to a system with discrete (i.e. digitally sampled) signal inputs.

DESCRIPTION

The disclosed method is an adaptive linear combiner, which is a tapped delay line with controllable weights on each tap, and outputs that are summed and subtracted from a reference to produce an error signal. While there are multiple possible embodiments to control the weights based on the error signal, a least mean square (LMS) is described here. After a sufficient number of cycles, the weight distribution indicates the delay of the received signal with respect to the reference, and by extension determines the distance between the tag and receiver.

The invention composes an accurate method of identifying the physical location of a vehicle as it passes through an RFID-based tolling zone. One problem of RFID-based toll systems is occasional reads from lanes displaced laterally from the nominal lane beneath an antenna; these are termed cross-lane reads. The cross lane reads are typically handled in the computer that controls the readers by relatively complicated methods. This method, because of its embodiment in the reader, immediately discards cross lane reads because of their large range to the target compared to the range for cars in the proper lane. Another useful aspect of the invention is another method of measuring vehicle speed. While speed can be measured in other ways, this approach allows for range and speed to be measured simultaneously.

In an embodiment of the invention, there is a system in an RFID backscatter tag reader for determining distance from an antenna to a backscatter RFID tag. The system includes: a transmitter for transmitting a transmitted modulated signal to the tag; a receiver for receiving a delayed modulated backscattered signal from the tag; and a linear adaptive combiner which is a tapped delay line with controllable weights on each tap, and outputs that are summed and subtracted from a reference to produce an error signal. Modulation in the backscattered signal is input to the adaptive linear combiner, and the transmitted modulated signal is the reference to the combiner and weights for the taps of the linear adaptive combiner are approximately zero for all of the taps except for the tap corresponding to the delay of the backscattered signal and wherein the distance is determined from the delay. In a further embodiment, the linear adaptive combiner has a sample rate and the system operates at a plurality of sample rates for each distance determination and an optimum distance is determined from the plurality of results.

In a further embodiment, there is a method for determining distance between an RFID backscatter tag and a first antenna. The method includes the steps of: transmitting a modulated signal to the tag through the first antenna; receiving through the first antenna a modulated backscattered signal from the tag; inputting the modulated backscattered signal to an adaptive linear combiner having taps, the taps having weights; applying the modulated signal to the adaptive linear combiner as a reference signal; determining a first signal delay time by which of the taps has the lowest weight; and calculating distance between the tag and the first antenna from the first signal delay time. In a further embodiment of the method a difference in height between the first antenna and the tag is estimated. In a further embodiment of the method, all of the steps are performed with a second antenna located at the same height as the first antenna and a second adaptive linear combiner to produce a second signal delay time, wherein the distance between the first and second antennas is known and wherein the first and second signal delay times are compared to determine a difference in height between the antennas and the tag.

Figure 1:
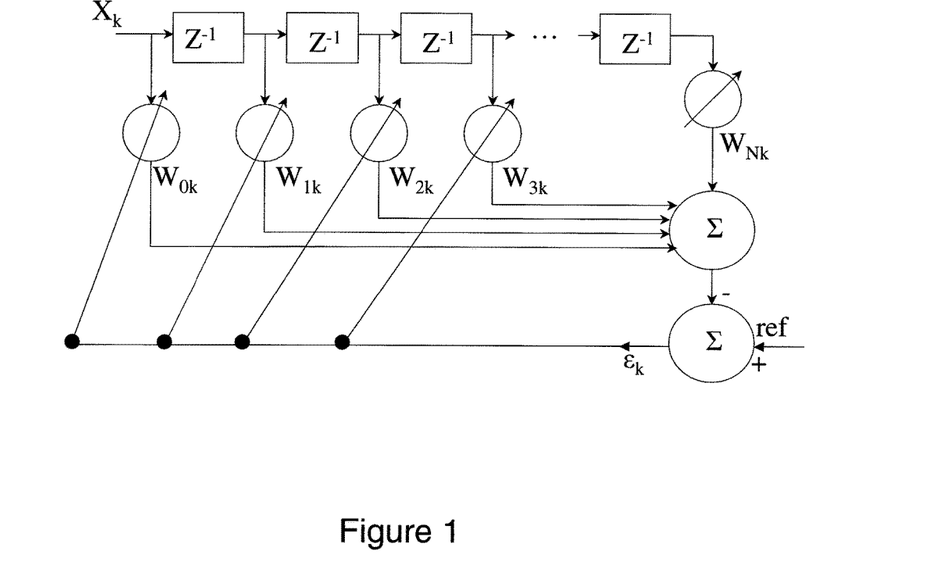
FIG. 1 is block diagram of an embodiment of a system for distance measurement.

FIG. 1 is a block diagram of the system under consideration. The index k indicates the dimension of time. FIG. 1 shows an adaptive linear combiner, transversal filter format. The weights are updated at each time step as follows:

$$\overline{W}_{0,k+1} = \overline{W}_{0,k} + \mu \varepsilon_k \overline{X}_k,$$
$$\overline{W}_{1,k+1} = \overline{W}_{1,k} + \mu \varepsilon_k \overline{X}_k,$$
$$\vdots \qquad \vdots$$
$$\overline{W}_{N,k+1} = \overline{W}_{N,k} + \mu \varepsilon_k \overline{X}_k.$$

This is the LMS algorithm. The parameter μ is a scalar gain coefficient. Each weight is adjusted at every time step according to the previous weight and previous input data, system error, and gain coefficient.

In an embodiment, the reader's transmitted CW energy is modulated during the uplink with a known pattern that will be recovered in the backscattered signal. The modulation in the backscattered signal becomes the input $X_k$ to the adaptive linear combiner, while the transmitted signal is the reference. The proper pattern of weights is a value of approximately zero for all but the one corresponding to the delay of the backscattered signal.

The sample rate of the A/D converter is an important quantity affecting the resolution of the proposed technique. The filter operates on samples that are one time step apart, so the final distribution of weights has the same granularity. This implies that the base resolution of the system is no better than the inverse of the sample rate. For a sample rate of 700 MHz, for example, the sample time is 1.42 nsec. Using a free space signal propagation speed of 1 foot/nsec, this corresponds to a physical delay of 1.42 feet. This delay corresponds to the (round trip) total range between the tag and receiver. The height of the receiver antenna requires a translation of this range to the horizontal range, which is the parameter of interest. Deviations of a foot in the total range can imply several feet in the horizontal range.

Basic Adaptive Filter

Figure 2:
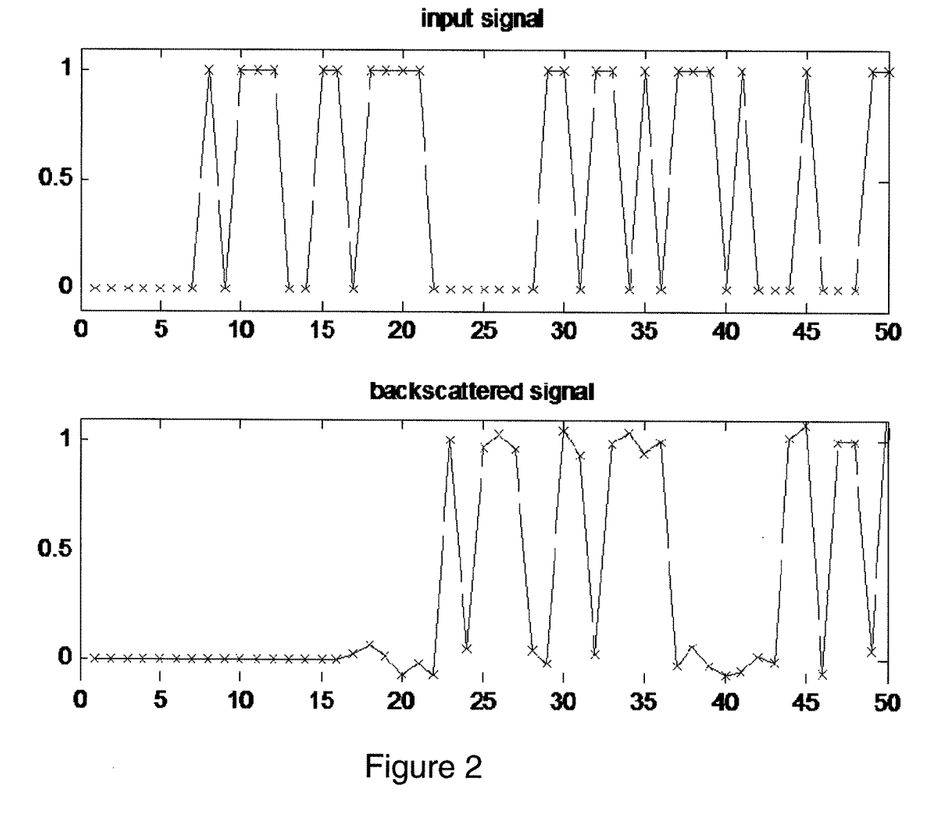
FIG. 2 shows a reference signal (upper graph) and backscattered signal containing a small amount of noise and lagging by 15 samples or 15 nsec. (lower graph)

Reference and backscattered signals are shown in FIG. 2. The sampling rate is 1 GHz. FIG. 2 shows a reference signal in the upper graph and in the lower graph a backscattered signal, containing a small amount of noise, and lagging by 15 samples or 15 nsec.

Figure 3:
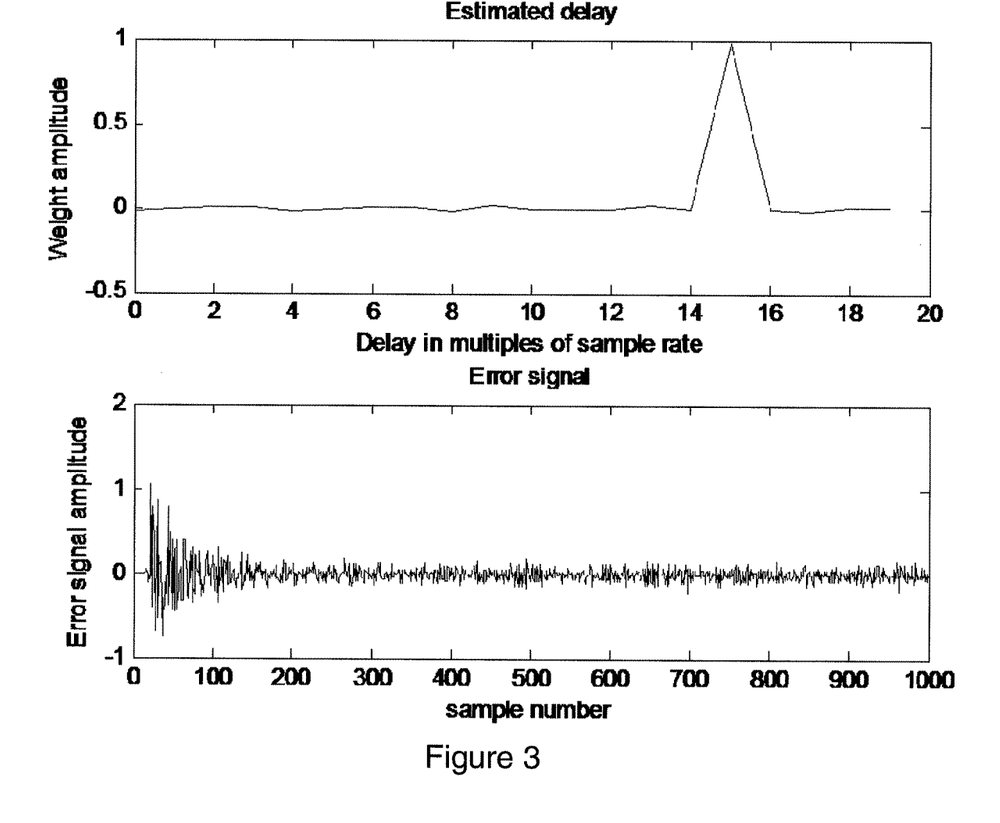
FIG. 3 shows a calculated final weight distribution after 1000 cycles (upper graph) and an error signal for the input in FIG. 2. The weights are initially zero.

FIG. 3 shows calculated final weight distribution, after 1000 cycles, and error signal for the input in FIG. 2. The weights are initially zero.

All weights are approximately zero except for the one representing a delay of 15 samples. Note that when the true delay is not equal to an integral number of clock cycles, the resulting weight distribution is still primarily concentrated on a single integer, depending on interference levels. The algorithm produces a delay that effectively rounds the true delay to the nearest N seconds, where N is the time between samples.

Complications from Reader Antenna Height

Figure 4:
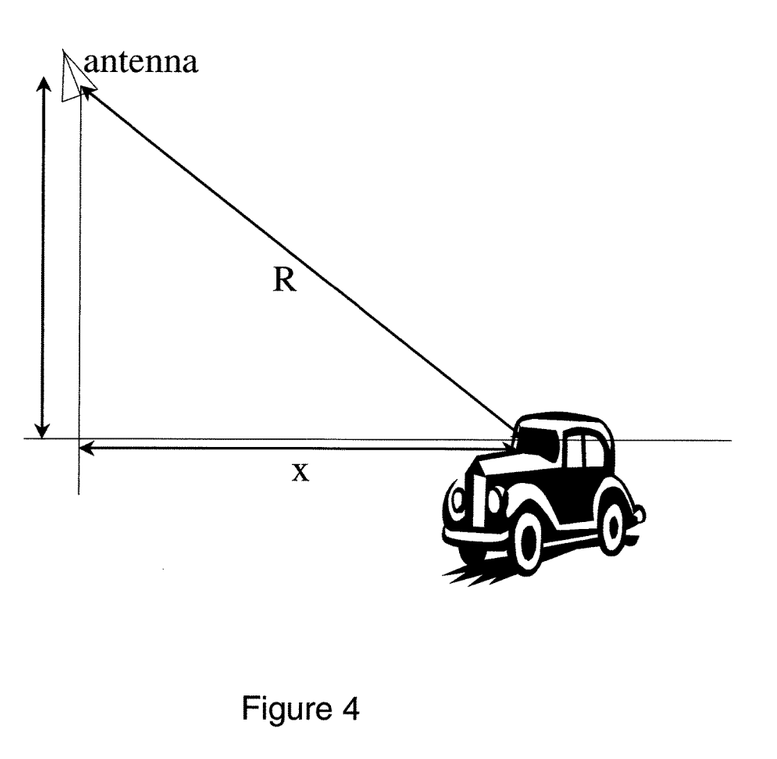
FIG. 4 is a diagram of a toll plaza antenna and a vehicle having an RFID tag.
Figure 5:
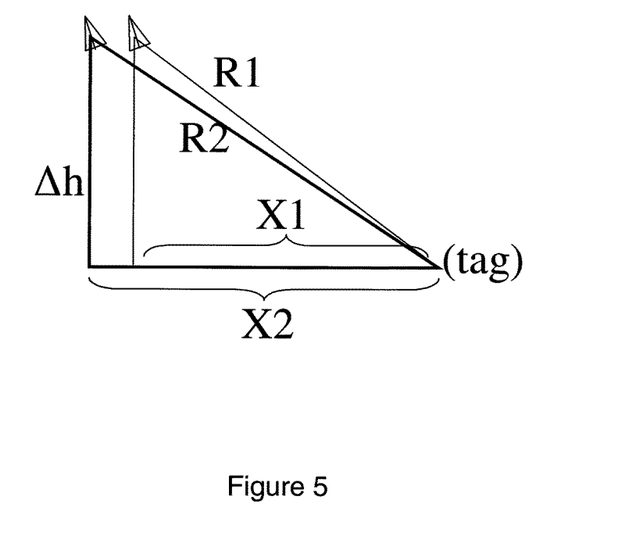
FIG. 5 is a diagram showing dimensions for a multiple antenna configuration.

The height of a typical reader antenna in a toll plaza (typically 18 feet) adds a complication to the problem, summarized in FIG. 4 and Table 1. FIG. 4 shows typical scenario dimensions as tabulated in Table 1, with range to tags for $\Delta h=13$ feet.

TABLE 1

| Horizontal distance to tag (x, feet) | Distance to tag (R, feet) | Distance to tag in adjacent lane (feet) |
| --- | --- | --- |
| 0 | 13 | 17.69 |
| 1 | 13.04 | 17.72 |
| 2 | 13.15 | 17.80 |
| 3 | 13.34 | 17.94 |
| 4 | 13.60 | 18.14 |
| 5 | 13.92 | 18.38 |
| 6 | 14.32 | 18.68 |
| 7 | 14.76 | 19.03 |
| 8 | 15.26 | 19.42 |
| 9 | 15.81 | 19.85 |
| 10 | 16.40 | 20.32 |
| 11 | 17.03 | 20.83 |
| 12 | 17.69 | 21.38 |

Therefore, a resolving the range to approximately a tenth of a foot is required to determine horizontal positions of a tag to within a foot. This is an order of magnitude less than the 1.42 feet limit on the range imposed by the sampling rate. The tags that are one lane away (12 feet) have ranges that are only about 4 feet greater for the same horizontal distance.

The adaptive filter can only resolve distances that are one 'sample' apart. However, utilizing different sampling rates will produce different range estimates. In general, changing the sampling rate in real time, producing one range estimate per sample rate, and choosing the maximum range estimate can theoretically achieve the required resolution.

For example, if $\Delta h$ is 13 feet, and actual true horizontal distance is 10 feet. The table below summarizes the estimated horizontal distances for 10 different clock rates. The noise and interference are negligible. Table 2 shows estimated distances for $\Delta h=13$ feet and x=10 feet, as a function of sample time. Note that the total range is $2*R_{est}$, and is equal to an integer multiple of the sample time.

TABLE 2

| Sample time (nsec) | Clock rate (MHz) | $R_{est}$ (feet) | $X_{est}$ (feet) |
| --- | --- | --- | --- |
| 1.428 | 700 | 15.7 | _8.8_ |
| 1.449 | 690 | 15.94 | 9.2 |
| 1.47 | 680 | 16.17 | 9.6 |
| 1.492 | 670 | 15.66 | 8.7 |
| 1.513 | 660 | 15.89 | 9.1 |
| 1.535 | 651 | 16.11 | 9.5 |
| 1.556 | 643 | 16.34 | _9.9_ |
| 1.577 | 634 | 15.77 | 8.9 |
| 1.599 | 625 | 15.99 | 9.3 |
| 1.62 | 617 | 16.2 | 9.7 |

The best and worst results in the fourth column are highlighted. The spread between best and worst results, highlighted in Table 2, is about 1 foot. However, as the horizontal distance is reduced, the spread increases, as seen in the next example with the same parameters as the previous example, except the horizontal distance is 4.1 feet.

TABLE 3

| Sample time (nsec) | Clock rate (MHz) | $R_{est}$ (feet) | $X_{est}$ (feet) |
| --- | --- | --- | --- |
| 1.428 | 700 | 13.56 | 3.9 |
| 1.449 | 690 | 13.04 | 1.0 |
| 1.47 | 680 | 13.23 | 2.5 |
| 1.492 | 670 | 13.43 | 3.4 |
| 1.513 | 660 | 13.62 | _4.1_ |
| 1.535 | 651 | 13.04 | 1.0 |
| 1.556 | 643 | 13.22 | 2.4 |
| 1.577 | 634 | 13.41 | 3.3 |
| 1.599 | 625 | 13.59 | 4.0 |
| 1.62 | 617 | 12.96 | _(imaginary!)_ |

Not only is the spread between best and worst estimates much larger, but the estimate is actually imaginary for one clock rate. This is because the horizontal distance is computed by $X_{est}=\sqrt{R_{est}^2-\Delta h^2}$, and the estimated value for $R_{est}$ is smaller than the value of $\Delta h$. The example underscores the fact that at short horizontal distances, a single estimate (i.e. one clock period) can be off by several feet or not even be a real number.

In general, this technique would require several clock cycle changes during one uplink period, producing several estimates for the range. The maximum value among the estimates is the closest to the true range.

Complications of Variable Tag Height

Additional complication comes from variation in the tag height. In order to estimate the horizontal range ($X_{est}$), the value of Δh must be assumed. If the assumed Δh is too high, the value for $X_{est}$ becomes imaginary at short ranges. If it is too low, the value for $X_{est}$ suffers from low accuracy at short ranges. This is demonstrated in Table 4, which shows. Estimated horizontal distances with an assumed Δh of 13' where actual Δh values vary per column.

TABLE 4

| X (feet) | $X_{est}$ (feet) for true Δh = 12' | $X_{est}$ (feet) for true Δh = 13' | $X_{est}$ (feet) for true Δh = 14' |
|---|---|---|---|
| 10 | 8.6 | 9.9 | 11.2 |
| 9 | 7.5 | 9.0 | 10.4 |
| 8 | 6.2 | 8.0 | 9.5 |
| 7 | 4.8 | 6.9 | 8.7 |
| 6 | 3.3 | 6.0 | 7.8 |
| 5 | 0 | 5.0 | 7.2 |
| 4 | j3.0 | 4.0 | 6.5 |
| 3 | j4.1 | 2.9 | 6.0 |
| 2 | j4.6 | 2.0 | 5.5 |
| 1 | j5 | 0.8 | 5.3 |

If the assumed Δh is near the true Δh, the error is small. The error is as high as 5' for the other cases, and imaginary ranges result if the assumed Δh is too high.

There are at least 2 ways to deal with this problem. The simplest and least accurate is to adjust the tag height assumption in real time when an imaginary range is computed. Another method is to add a second antenna and receiver, using the known separation between the antennas to determine a better assumption for Δh and therefore a more accurate horizontal distance estimate.

Method 1: Adjustment of Assumed Height

The simplest but least accurate approach is to begin the estimate process with an assumption for Δh that represents an average value. Then it is reduced as needed, when the resulting horizontal range estimate becomes imaginary. Consider the second column in Table 4, where the assumed Δh is 13' and the true Δh is 12'. The error at a 10' range is 1.4' and increases as the tag moves closer to the antenna, reaching 5' when the tag is 5' away. At closer distances, the estimated range is imaginary with an assumed Δh of 13', but if the assumed Δh is reduced to 12', the error will be less than 1'. There may be more sophisticated methods of adjusting the assumed Δh that result in increased accuracy.

Altering the assumed Δh does not require re-running the adaptive filter through an additional cycle. The filter specifically computes the range R, not the horizontal range. The imaginary number results from the single calculation $X_{est} = \sqrt{R_{est}^2 - \Delta h^2}$, and altering the assumed Δh and re-calculating can be done without re-estimating X.

Method 2: Multiple Antennas

For a given assumed height Δh, the estimated horizontal ranges are:

$$X_{1est} = \sqrt{R_{1est}^2 - \Delta h^2} \text{ and } X_{2est} = \sqrt{R_{2est}^2 - \Delta h^2}.$$

and the difference between the two, $$X_{1est} - X_{2est} = \sqrt{R_{1est}^2 - \Delta h^2} - \sqrt{R_{2est}^2 - \Delta h^2},$$

can be compared to the known quantity $X_1 - X_2$.

If the estimated difference is greater/less than the true difference, the assumed Δh must be reduced/increased. This is repeated until estimated and true values of $X_1 - X_2$ are within an acceptable tolerance. This method requires an additional antenna and processing bank. The potential for imaginary ranges is still present, and would require reducing the assumed value of Δh, as in the case of a single antenna.

The foregoing description and drawings should be considered as illustrative only of the principles of the invention. The invention may be configured in a variety of ways and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A radio frequency identification (RFID) tag reader comprising:
   a transmitter configured to transmit a modulated signal to a tag via a first antenna;
   a receiver configured to receive a delayed modulated backscattered signal from the tag; and
   a linear adaptive combiner comprising a tapped delay line having a plurality of taps with controllable weights on each tap and outputs that are summed and subtracted from a reference to produce an error signal;
   wherein, for a first sample rate, modulation from the delayed modulated backscattered signal is input to said linear adaptive combiner, and modulation from said transmitted modulated signal is said reference to said linear adaptive combiner and wherein weights for said taps of said linear adaptive combiner are approximately zero for all of said taps except for a tap corresponding to the delay of the received modulated backscattered signal and wherein a first distance estimate between the tag and the first antenna corresponding to said first sample rate is determined from said delay;
   wherein for a second sample rate, modulation in the delayed modulated backscattered signal is input to said linear adaptive combiner, and modulation from said transmitted modulated signal is said reference to said linear adaptive combiner and wherein weights for said taps of said linear adaptive combiner are approximately zero for all of said taps except for a tap corresponding to the delay of the received modulated backscattered signal and wherein a second distance estimate between the tag and the first antenna corresponding to said second sample rate is determined from said delay; and
   wherein a final distance estimate between said first antenna and the tag is determined based on comparing said first and second distance estimates.

2. The RFID backscatter tag reader of claim 1, wherein said final distance estimate is determined by selecting the greater of said first and second distance estimates.

3. The RFID backscatter tag reader of claim 1, wherein said controllable weights are adjusted based on a least means square fit of said error signal.

4. The RFID backscatter tag reader of claim 1, wherein a horizontal distance estimate between said first antenna and said tag is determined based on said final distance estimate, a height of said first antenna and a first estimate of height of said tag relative to said height of said first antenna.

5. The RFID backscatter tag reader of claim 4, wherein said horizontal distance estimate between said first antenna and said tag is determined further based on revising said first estimate of height of said tag relative to said height of said first antenna.

6. The RFID backscatter tag reader of claim 1, wherein a horizontal distance estimate between said first antenna and said tag is determined based on said final distance estimate, a height of said first antenna, a distance between said first antenna and a second antenna at a second antenna height and a third distance estimate based on transmission of a second transmitted modulated signal to the tag via said second antenna and reception of a second delayed modulated backscattered signal at the second antenna from the tag.

7. The RFID backscatter tag reader of claim 6, wherein said horizontal distance estimate between said first antenna and said tag is further determined by estimating tag height relative to said height of said first antenna and said height of said second antenna.

8. A method for determining distance between a first antenna and a tag comprising:
   transmitting a modulated signal to the tag via the first antenna;
   receiving a delayed modulated backscattered signal from the tag;
   for a first sample rate, inputting modulation in the delayed modulated backscattered signal to an adaptive linear combiner, said adaptive linear combiner comprising a tapped delay line having a plurality of taps with controllable weights on each tap, and outputs that are summed and subtracted from a reference to produce an error signal;
   for said first sample rate, providing modulation from said transmitted modulated signal as a reference to said adaptive linear combiner;
   for said first sample rate, adjusting weights for said taps of said linear adaptive combiner such that said weights are approximately zero for all of said taps except for a tap corresponding to the delay of the received backscattered signal;
   determining a first distance estimate between the tag and the first antenna corresponding to said first sample rate based on said delay;
   for a second sample rate, inputting modulation in the delayed modulated backscattered signal to said adaptive linear combiner;
   for said second sample rate, providing modulation from said transmitted modulated signal as a reference to said adaptive linear combiner;
   for said second sample rate, adjusting weights for said taps of said linear adaptive combiner such that said weights are approximately zero for all of said taps except for a tap corresponding to the delay of the received backscattered signal;
   determining a second distance estimate between the tag and the first antenna corresponding to said second sample rate based on said delay; and
   comparing said first and second distance estimates to determine a final distance estimate between said first antenna and the tag.

9. The method of claim 8, further comprising selecting the greater of said first and second distance estimates to determine said final distance estimate.

10. The method of claim 8, further comprising adjusting said controllable weights based on a least means square fit of said error signal.

11. The method of claim 8, further comprising determining a horizontal distance estimate between said first antenna and said tag based on said final distance estimate, a height of said first antenna and a first estimate of a height of said tag relative to said height of said first antenna.

12. The method claim 11, wherein said horizontal distance estimate between said first antenna and said tag is further determined based on revising said first estimate of height of said tag relative to said height of said first antenna.

13. The method of claim 8, further comprising determining a horizontal distance estimate between said first antenna and said tag based on said final distance estimate, a height of said first antenna, a distance between said first antenna and a second antenna at a second antenna height and a third distance estimate based on transmission of a second transmitted modulated signal to the tag via said second antenna and reception from the tag of a second delayed modulated backscattered signal at the second antenna.

14. The method of claim 13, wherein said horizontal distance estimate between said first antenna and said tag is further determined by estimating tag height relative to said height of said first antenna and said height of said second antenna.

* * * * *